(12) United States Patent
Venkataramani

(10) Patent No.: US 12,242,593 B1
(45) Date of Patent: Mar. 4, 2025

(54) TESTING FOR UNCHANGED PASSWORDS IN IoT DEVICES

(71) Applicant: Amazon Technologies, Inc., Seattle, WA (US)

(72) Inventor: Eknath Venkataramani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 317 days.

(21) Appl. No.: 17/543,593

(22) Filed: Dec. 6, 2021

(51) Int. Cl.
*G06F 21/46* (2013.01)

(52) U.S. Cl.
CPC .................................. *G06F 21/46* (2013.01)

(58) Field of Classification Search
CPC .......... G06F 21/30; G06F 21/60; G06F 21/45; G06F 21/46; H04L 63/083; H04W 12/06; H04W 12/08
See application file for complete search history.

(56) References Cited

U.S. PATENT DOCUMENTS

| | | | | |
|---|---|---|---|---|
| 5,793,952 | A * | 8/1998 | Limsico | G06F 21/31 726/18 |
| 8,627,422 | B2 | 1/2014 | Hawkes et al. | |
| 10,848,495 | B2 * | 11/2020 | Kale | H04L 63/102 |
| 10,931,660 | B2 * | 2/2021 | Marinho | H04L 63/1433 |
| 11,184,386 | B1 * | 11/2021 | Schroeder | H04L 63/0846 |
| 11,283,881 | B1 * | 3/2022 | Nanda | H04L 67/12 |
| 2008/0313721 | A1 | 12/2008 | Corella | |
| 2012/0143916 | A1 * | 6/2012 | Viripaeff | G06F 8/61 707/783 |
| 2016/0212099 | A1 * | 7/2016 | Zou | H04L 63/1408 |
| 2017/0111335 | A1 * | 4/2017 | Hibbert | H04L 63/083 |
| 2018/0124028 | A1 * | 5/2018 | Fujimoto | H04L 63/0853 |
| 2018/0309786 | A1 * | 10/2018 | Apelewicz | H04W 12/04 |
| 2019/0052615 | A1 * | 2/2019 | Auvenshine | H04L 63/068 |
| 2019/0190939 | A1 * | 6/2019 | Cheng | H04L 41/069 |
| 2020/0007395 | A1 * | 1/2020 | Fainberg | H04L 41/0894 |
| 2021/0037000 | A1 * | 2/2021 | Attard | G06N 20/00 |
| 2021/0110026 | A1 * | 4/2021 | Liu | G06F 21/33 |
| 2021/0182379 | A1 * | 6/2021 | Sanchez | H04L 63/123 |
| 2021/0359897 | A1 * | 11/2021 | Shaked | H04L 12/281 |

FOREIGN PATENT DOCUMENTS

| | | | | |
|---|---|---|---|---|
| EP | 3043585 A1 * | 7/2016 | ......... | H04L 51/046 |
| GB | 2590467 A * | 6/2021 | ......... | G06F 21/44 |
| KR | 20190048587 A * | 5/2019 | | |

* cited by examiner

*Primary Examiner* — Theodore C Parsons
*Assistant Examiner* — James P Moles
(74) *Attorney, Agent, or Firm* — Robert C. Kowert; Kowert, Hood, Munyon, Rankin & Goetzel, P.C.

(57) ABSTRACT

An agent running on an IoT device of a client's network may receive a default password from a provider network and use the received default password to determine whether the password assigned to the IoT device has been changed from the default password to a different one. The agent may retrieve a salt string, a hashing algorithm, and a hashed string from a password database of the IoT device, combine the salt string with the received default password to generate a salted default password, and apply the hashing algorithm to the salted default password to generate a new hashed string. The agent may then compare the new hashed string to the hashed string retrieved from the password database. If they match, then the agent sends an indication to the provider network that the default password is still assigned to the IoT device.

20 Claims, 7 Drawing Sheets

TESTING FOR UNCHANGED PASSWORDS IN IoT DEVICES

BACKGROUND

The Internet of Things (IoT) is a phrase given for the interconnection of computing devices scattered around the globe within the existing internet infrastructure. Clients (e.g., customers) of a remote service provider may leverage the internet-based connectivity of IoT devices by using a service offered by the service provider. For example, a temperature sensor at a client site may collect temperature values for different equipment and transmit the temperature values to the remote service provider for analysis (e.g., to determine whether a machine needs servicing).

IoT devices are often assigned a default password by the provider of the IoT device (e.g., the manufacturer, the service provider, or other third-party provider). If the client does not change the default password to a different password, the IoT device will be more vulnerable to unauthorized access. Therefore, failure to change the default password may be considered a cybersecurity weakness of IoT devices. In some cases, the client may be required to change the default password in order to be compliant with security policies of a government or other entity. However, due to the risks of exposing passwords of a client's IoT devices as well as the potentially large number of IoT devices in the client's fleet, it can be extremely challenging to verify, in a secure and efficient way, that the default passwords of the client's IoT devices have been changed.

Figure 1:
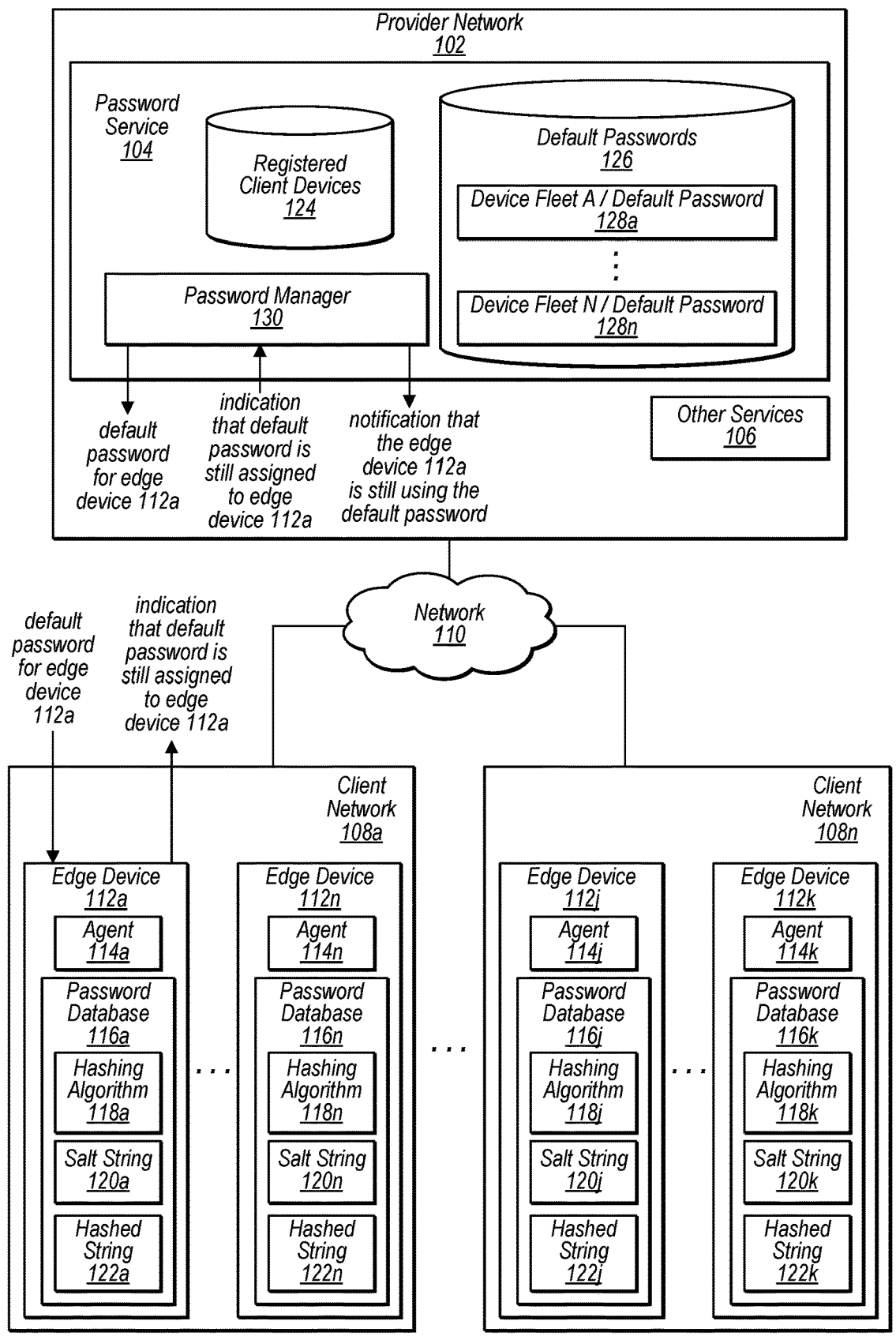
FIG. 1 is a logical block diagram illustrating a system for testing for unchanged passwords in IoT devices, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to test for unchanged passwords in IoT devices (also referred to herein as edge devices), according to some embodiments. Such testing for unchanged passwords in IoT devices can allow for a more reliable, more efficient, and more secure way to determine whether default passwords of a client's IoT devices have been changed, compared to traditional techniques.

In various embodiments, a default password for an edge device (or a fleet of edge devices) of a client may be not be secret, may be publicly available, and/or may be relatively easy to discover. In embodiments, the default password may be transmitted from a remote provider network to an agent running on the edge device using a secure/authenticated connection for communication (e.g., transport layer security (TLS) connection).

The agent running on the edge device may have access to a salt string, a hashing algorithm, and a hashed string that are already stored at the edge device (e.g., in a secure password database on the edge device). The salt string may be combined with the default password and then hashed to generate a new hashed string. The new hashed string may be compared to the hashed string that is already stored on the edge device in order to determine whether the edge device is still using the default password. If they match, then the agent determines that the edge device is still using the default password; if not, then the agent determines that the edge device is no longer using the default password and is using a different password.

In some embodiments, a salt string is not used to create the hashed string or the new hashed string. After the agent receives the default password from the provider network, the agent applies the hashing algorithm to the default password to generate a new hashed string (no salt string is combined with the default password). The new hashed string may be compared to the hashed string that is already stored on the edge device in order to determine whether the edge device is still using the default password. If they match, then the agent determines that the edge device is still using the default password; if not, then the agent determines that the edge device is no longer using the default password and is using a different password.

In embodiments, the agent may use the same secure connection to communicate the state of password back to the provider network. This may allow the client to perform a live audit for the password state of edge devices that have been deployed to the field. In embodiments, the default password may be specified/provided to the provider network at any time, providing more flexibility with respect to changing project timelines, compared to traditional techniques.

In various embodiments, using a hashed version of the password of the edge device instead of an unhashed (e.g., clear text) version enables comparison of the hashed version of the password of the edge device with the hashed version of the default password without exposing what the password of the edge device actually is. This reduces or eliminates the risk that the agent may be used as another attack vector by a malicious actor trying to obtain the edge device's password.

In embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 7 and described below.

This specification begins with a description of a system for monitoring for testing for unchanged passwords in IoT devices. A number of different methods and techniques for testing for unchanged passwords in IoT devices, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for testing for unchanged passwords in IoT devices, according to some embodiments.

As shown, a provider network 102 includes a password service 104 that sends default passwords to edge devices that allows edge devices to test for unchanged passwords. In the example embodiment, the provider network 102 may include any number of other services 106. For example, a service 106 may implement data storage services or compute services that may be used by the password service to perform any of the functionality described herein. In some embodiments, a service 106 may execute a client-owned application that receives data from client edge devices and/or sends data to client edge devices.

In various embodiments, the password service 104 may perform any number of tasks/functionality to manage any number of edge devices for any of the clients of the IoT service (e.g., device registration, provisioning any number edge devices, authentication of edge devices, routing to/from the edge devices to/from other services of the provider network). In various embodiments, any described functionality/tasks that may be performed by the password service may instead be implemented, at least in part, by one or more of the other services 106 (e.g., storing information for registered edge devices, authentication and/or provisioning edge devices).

In the depicted embodiment, any number of clients (e.g., customers) of the provider network 102 may use the password service 104 via communication between the password service 104 and a remote client network 108 of a client of the password service 104 (e.g., via a wide area network 110, such as the internet). For example, a client may own/manage the client network 108a, which may include any number of edge devices 112a-112n that may send data to the password service 104 of the provider network 102 and/or receive data from the password service 104 of the provider network 102. Similarly, any number of other clients may use the IoT service 104 with any number of other edge devices in the same or similar manner (e.g., using any number of edge devices 112 of other client network(s)).

In embodiments, a given client network may include any number of fleets (e.g., groups) of edge devices, and each fleet may include any number of edge devices that belong to the fleet. In an embodiment, each fleet may be separately assigned its own default password. The default password of a given fleet may be different or the same as the default password of other fleets.

As shown, each edge device may include an agent 114 and a password database 116. The password database includes a hashing algorithm 118, a salt string 120, and a hashed string 122. The agent 114 and/or password database 116 (including any of its components) may be software and/or hardware that is installed onto the edge device by the manufacturer, the service provider, or other third-party provider before or after the edge device is provided to the client for connection to the client network.

In embodiments, an agent and/or the password database may be installed by the manufacturer during production or may be downloaded over the network 110 from the manufacturer, service provider, or other third-party provider and then installed onto the edge device after it is connected to the client network. In embodiments, a secure password database may be any type of data store that securely stores data (e.g., the data may be inaccessible to a user if the user is not assigned the necessary access permissions).

In some embodiments, the hashed string 122 may be initialized based on the default password that is assigned to the edge device and/or assigned to a fleet of edge devices to be used by a client. If the default password to be assigned to an edge device is "defaultpassword" and the salt string is "salt," then the hashed string 122 may be computed by first combining "salt" with "defaultpassword" to form a salted default password (e.g., prepending or appending "salt" with "password" to form the string "saltdefaultpassword" or "defaultpasswordsalt") and then applying the hashing algorithm 118 to the salted default password.

In embodiments, the edge device itself may compute the initial hashed string 122 based on receiving the initial password as input during device configuration (or any other point in time) and computing it as described above. In various embodiments, the initial hashed string may be received by the edge device while on-site at the manufacturer, service provider, or other third-party. In some embodiments, the edge device may already be at the client's site and the initial hashed string may be downloaded from a remote manufacturer, service provider, or other third-party provider as described above.

In the example embodiment, the password service 104 includes a data store that stores data indicating any number of registered client devices 124 that may be registered for any number of clients of the password service 104. For example, a user may register edge devices 112 of client network 108a by providing unique identifiers and/or other device-specific data for any number of edge devices 112.

As shown, another data store may store default passwords 126 for any number of edge devices and/or fleets of edge devices. For example, device fleet A/default password 128a may store the default password for any number of edge devices that belong to device fleet A (e.g., a group of edge devices used by one or more particular clients).

In the example embodiment, the password service 104 also includes a password manager 130 that may perform actions related to management of edge device passwords (or any other actions of the password service/provider network described herein). For example, the password manager 130 may send a default password to any number of edge devices, receive an indication of whether the default password has changed for the edge devices, and perform one or more actions in response to the indication (e.g., notify a user/administrator of the password state of the edge device(s)).

In some embodiments, an agent of an edge device may perform various actions in order to test for an unchanged password of the edge device (e.g., after the edge device is connected to the client network and/or powered on). For example, the agent 114a may retrieve security data from the password database 116*a* of the edge device 112*a* (e.g., the hashing algorithm 118*a*, the salt string 120, and the hashed string 122).

In embodiments, the agent has access permission (e.g., has been granted access permission) to enable the agent to retrieve security data from the password database (e.g., by an operating system of the edge device). For example, if the agent is assigned a high-level access permission, it may be able to retrieve the security data but if the agent is assigned a lower-level access permission, then it will be unable to retrieve the security data.

In an embodiment, the agent may request the security data from the password database (e.g., send a query to the password database for the security data). In response to receiving the request/query, the edge device (e.g., the operating system) may determine that the agent has permission to access the password database and in response, provide access of the password database to the agent (e.g., send the security data to the agent). Therefore, in embodiments, the retrieval of the security data by the agent from the password database may be based on permission granted to the agent to access the password database.

The agent may then identify the hashing algorithm 118*a*, the salt string 120, and the hashed string 122 based on the obtained security data. For example, if the security data is a string that includes the hashing algorithm 118*a*, the salt string 120, and the hashed string 122, then the agent may parse out the hashing algorithm 118*a*, salt string 120, and hashed string 122 from the string.

In some embodiments, the edge device may generate the salt string based on an algorithm. For example, the edge device may execute a salt generation program that runs an algorithm that may generate a random or pseudo-random salt string (e.g., implementing a random string generator algorithm). The salt string may be inaccessible from outside of the edge device (e.g., accessible only to components of the edge device, such as the agent and/or other internal components that have permission to access the salt string or password database). This may result in different edge devices using different salt strings, adding an additional layer of security from an attacker.

In embodiments, the edge device 112*a* establishes a connection with the remote provider network 102 in accordance with a secure communication protocol (e.g., TLS). In an embodiment, the edge device may send a device identifier(s) and/or security information (e.g., client certificate, encryption keys) to the password manager 130 and the password manager may authenticate the edge device based on the identifier and/or security information and establish the connection with the edge device.

In some embodiments, the edge device is inaccessible from outside of the local network via a public internet protocol (IP) address (e.g., due to presence of a network routing device and/or firewall). Therefore, the edge device may initiate the connection with the provider network by sending a connection request to the provider network (e.g., to an IP address associated with the password service). In embodiments, the connection request may be a request to establish a secure connection (e.g., using mutual authentication and/or TLS).

The edge device 112*a* may receive, from the password manager via the connection, the default password associated with the edge device. For example, the password manager 130 may determine, based on the identifier(s), that the edge device 112*a* is part of "fleet A," obtain the default password for fleet A from the default passwords 126, and send the default password to the edge device 112*a*.

In some embodiments, the edge device 112*a* may combine the salt string 120 with the default password received from the password manager to generate a salted default password (e.g., by prepending or appending the salt string to the default password). The edge device 112*a* may then apply the hashing algorithm to the salted default password to generate a new hashed string.

The edge device 112*a* may then determine whether the hashed string at the edge device (the hashed string obtained from the password database) matches the new hashed string. If so, then the edge device may send to the provider network (e.g., the password manager) an indication that the default password is currently assigned to the edge device for password-based access of the edge device. If not, then the edge device may send to the provider network (e.g., the password manager) an indication that the default password is not currently assigned to the edge device for password-based access of the edge device (e.g., an indication that a different password is assigned to the edge device).

Shortly after an edge device is installed on a client network, it may still be assigned the default password and send an indication that the default password is currently assigned to the edge device. However, the password may be updated by a user at a later point in time. When the edge device receives the default password again, it may then send an indication that the default password is not currently assigned to the edge device.

Figure 2:
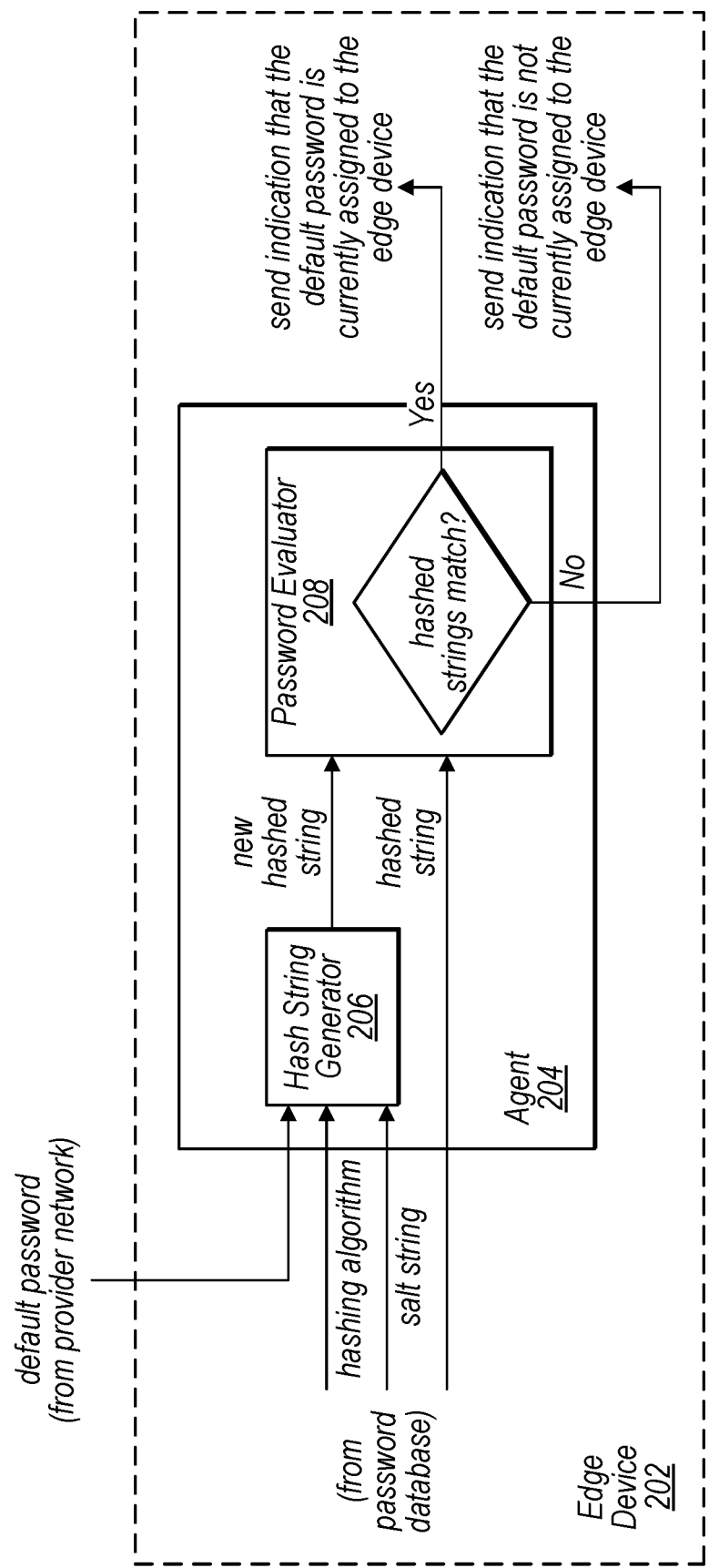
FIG. 2 illustrates an agent of an edge device that determines whether the default password is currently assigned to the edge device, according to some embodiments.

FIG. 2 illustrates an agent of an edge device that determines whether the default password is currently assigned to the edge device, according to some embodiments.

In the depicted embodiment, an edge device 202 of a client network includes an agent 204. The edge device 202 and agent 204 may be examples of the edge devices/agents of FIG. 1. In embodiments, the agent may be software code executed by one or more processors of the edge device.

As shown, the agent 204 includes a hash string generator 206 that obtains the default password from the provider network (e.g., the password service). The hash string generator 206 also obtains the hashing algorithm and salt string from the password database (e.g., password database 116 of FIG. 1). As described in FIG. 1, the hash string generator combines the default password with the salt string to generate a salted default password and then applies the hashing algorithm on the salted default password to generate the new hashed string.

The password evaluator 208 receives the new hashed string and compares it to the hashed string that is obtained from the password database. If the new hashed string matches the hashed string, then the password evaluator sends to the provider network an indication that the default password is currently assigned to the edge device for password-based access. If the new hashed string does not match the hashed string, then the password evaluator sends to the provider network an indication that the default password is not currently assigned to the edge device for password-based access.

Figure 3A:
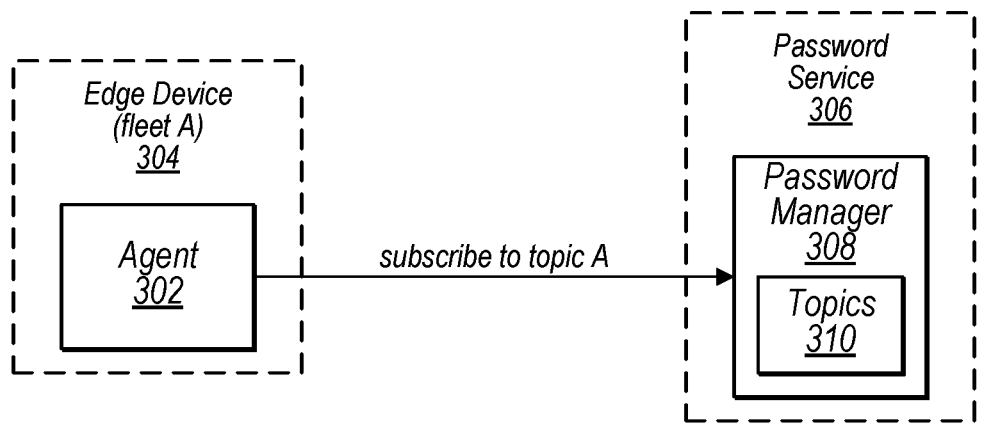
FIGS. 3A-3C illustrate an agent of an edge device using a publish-subscribe protocol to communicate with a password service of a provider network, according to some embodiments.
Figure 3B:
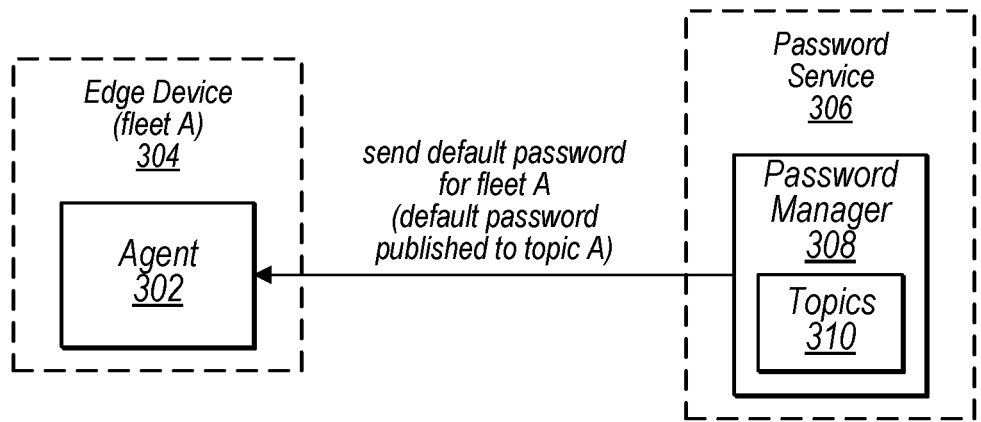
Figure 3C:
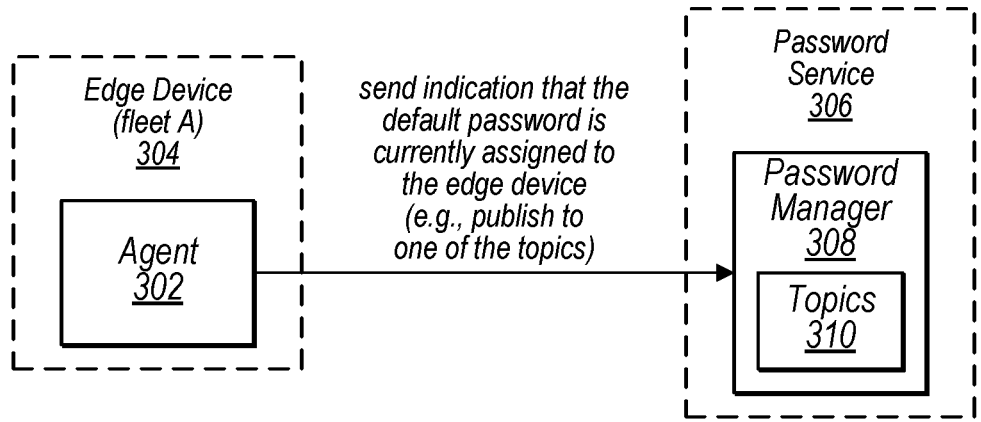

FIGS. 3A-3C illustrate an agent of an edge device using a publish-subscribe protocol to communicate with a password service of a provider network, according to some embodiments.

As depicted n FIG. 3A, after an agent 302 of an edge device 304 establishes a secure connection with the password service 306 of a provider network, the agent 302 may subscribe to "topic A" according to a publish-subscribe network protocol (e.g., MQTT). As shown, the password manager 308 may function as a message broker for any number of topics 310 (including topic A) according to the publish-subscribe network protocol.

In the depicted example, topic A may be a topic that is used for publishing the default password for edge devices that belong to fleet A. In FIG. 3B, the password manager obtains the default password for fleet A (e.g., from the default passwords 126 data store) and publishes a message to topic A that includes the default password. Publishing the message causes the password manager to send the message (including the default password associated with the edge device 304) to the edge device 304.

As shown in FIG. 3C, the agent determines that the default password is assigned to the edge device 304 and in response, sends an indication to the provider network that the default password is currently assigned to the edge device for password-based access. In embodiments, to send the indication, the edge device 304 may publish the indication to the same topic (topic A) or to a different topic.

In some embodiments, the edge device may instead send the indication to an endpoint for the password service (e.g., without using the publish-subscribe protocol). Although FIGS. 3A-3C describe an example using a publish-subscribe protocol for communication of messages between the password service and the edge device, any other method of communication over a long-term connection may be used.

Figure 4:
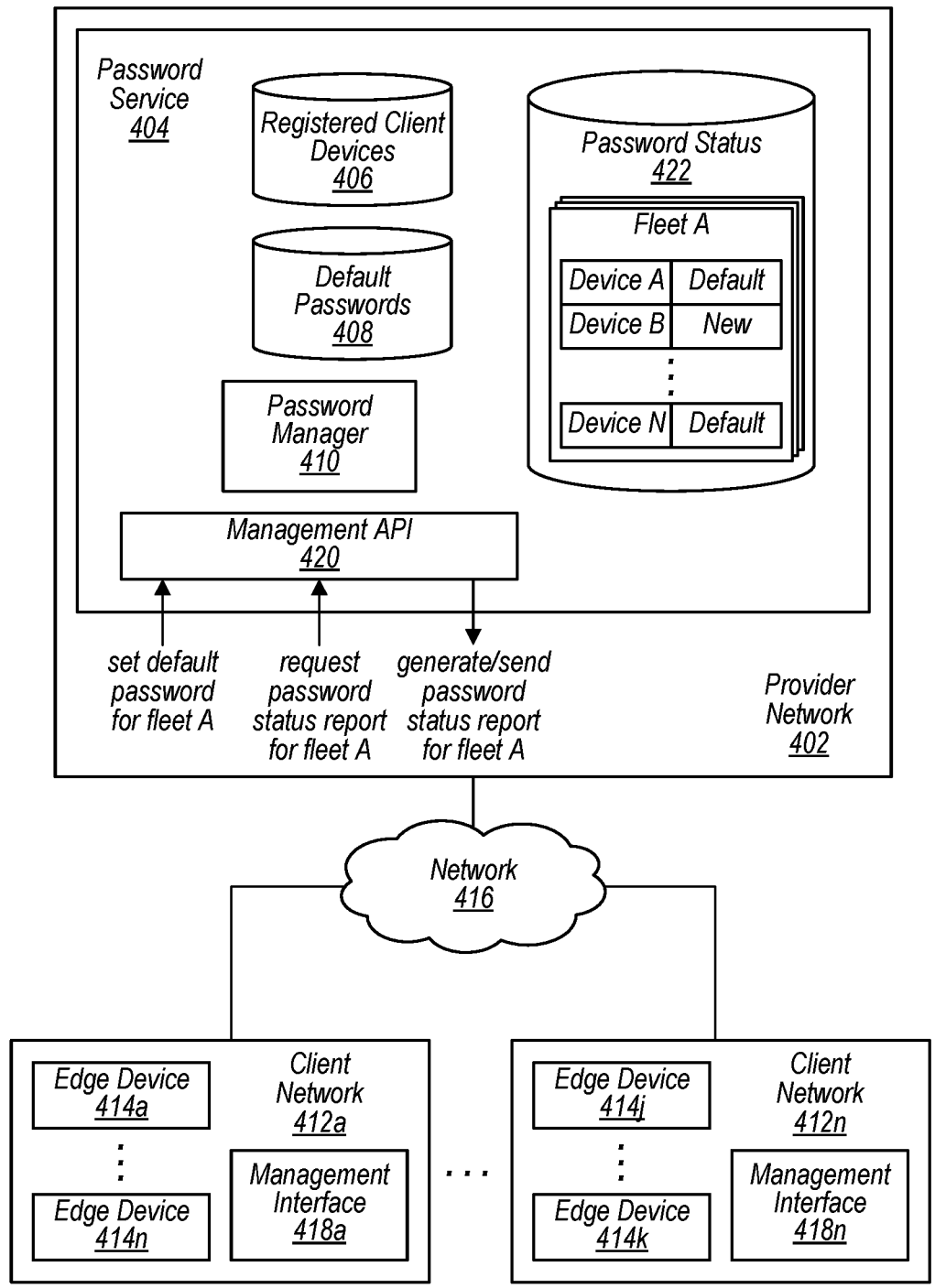
FIG. 4 is a logical block diagram illustrating a system for testing for unchanged passwords in IoT devices, according to some embodiments.

FIG. 4 is a logical block diagram illustrating a system for testing for unchanged passwords in IoT devices, according to some embodiments.

Similar to FIG. 1, the depicted example includes a provider network 402 that implements a password service 404, which includes a data store of registered client devices 406, a data store of default passwords 408, and a password manager 410. As in FIG. 1, client networks 412 may each include any number of edge devices 414 that may communicate with the provider network via a wide area network 416, such as the internet.

As shown, each client network 412 may include a management interface 418. A management interface (e.g., graphical user interface (GUI), command line interface, and/or application programming interface (API)) may be implemented by any type of computing device and may allow a user (e.g., administrator) to input data (e.g., configuration data such default passwords for edge devices/fleets, etc.).

The password service 104 may also include a management application programming interface (API) 420 that receives data from the management interface 418 of a client network. For example, the management API 420 may receive a default password for fleet A from the management interface 418 of the client network 412a (e.g., based on user input). As shown, the password service 104 also includes a password status 422 data store that stores a password status for any number of edge devices/fleets of any number of clients.

In embodiments, the password status 422 data store may be updated for a given edge device any time that the password manager receives an indication from the given edge device that the default password is assigned or is not assigned. As shown, device A of fleet A and device N of fleet A are both assigned the default password, whereas device B of fleet A is assigned a new/different password than the default password. As shown, the password status 422 data store may store the password status for any number of fleets that may each belong to any number clients.

In the example embodiment, the management API 420 may also receive, from a management interface of a client, a request for a password status report for any number of edge devices of the client. For example, the management API 420 may receive, from the management interface 418a of client 412a, a password status report for fleet A. In embodiments, fleet A may include edge device 414a-414n, and the corresponding password status for the edge devices may be stored in the password status 422 data store as "Device A"-"Device N."

In some embodiments, the management API 420 may cause a report to be generated and/or sent to the management interface 418 in response to receiving the request for the password status report for fleet A (e.g., my causing the password manager 410 to obtain the password status for each edge device and send the list of edge device identifiers (Device A-N) and the corresponding password status (e.g., default or new) to the management interface for display to a user). This may allow a user/administrator to easily determine the password status of each edge device of a fleet or of multiple fleets.

Figure 5:
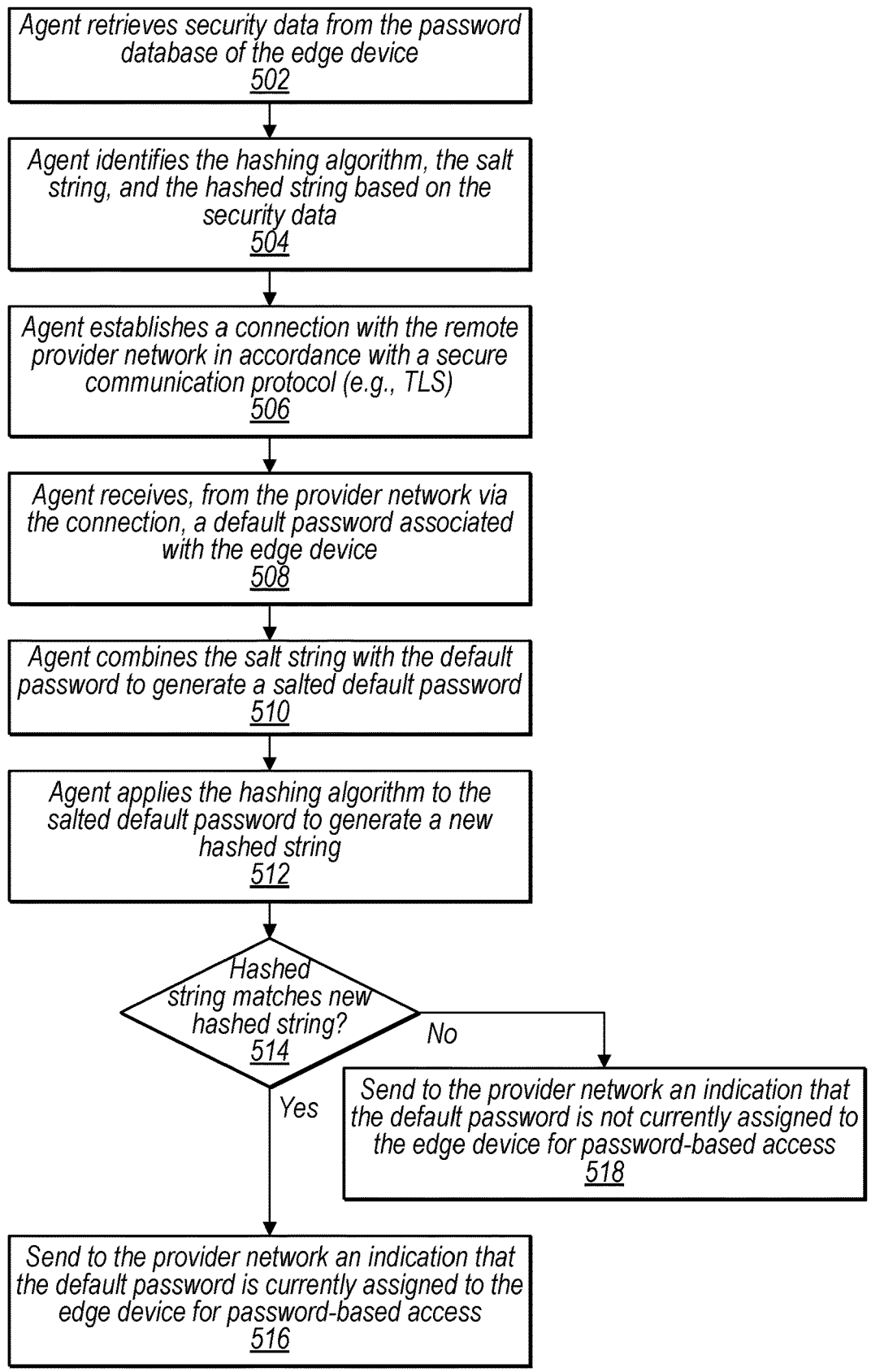
FIG. 5 is a high-level flowchart illustrating various methods and techniques for testing for unchanged passwords in IoT devices, according to some embodiments.

FIG. 5 is a high-level flowchart illustrating various methods and techniques for testing for unchanged passwords in IoT devices, according to some embodiments. In various embodiments, any of the functionality described for any portions of the flowcharts 5-7 may be performed by any of the components of FIGS. 1-4 and/or 7.

Figure 6:
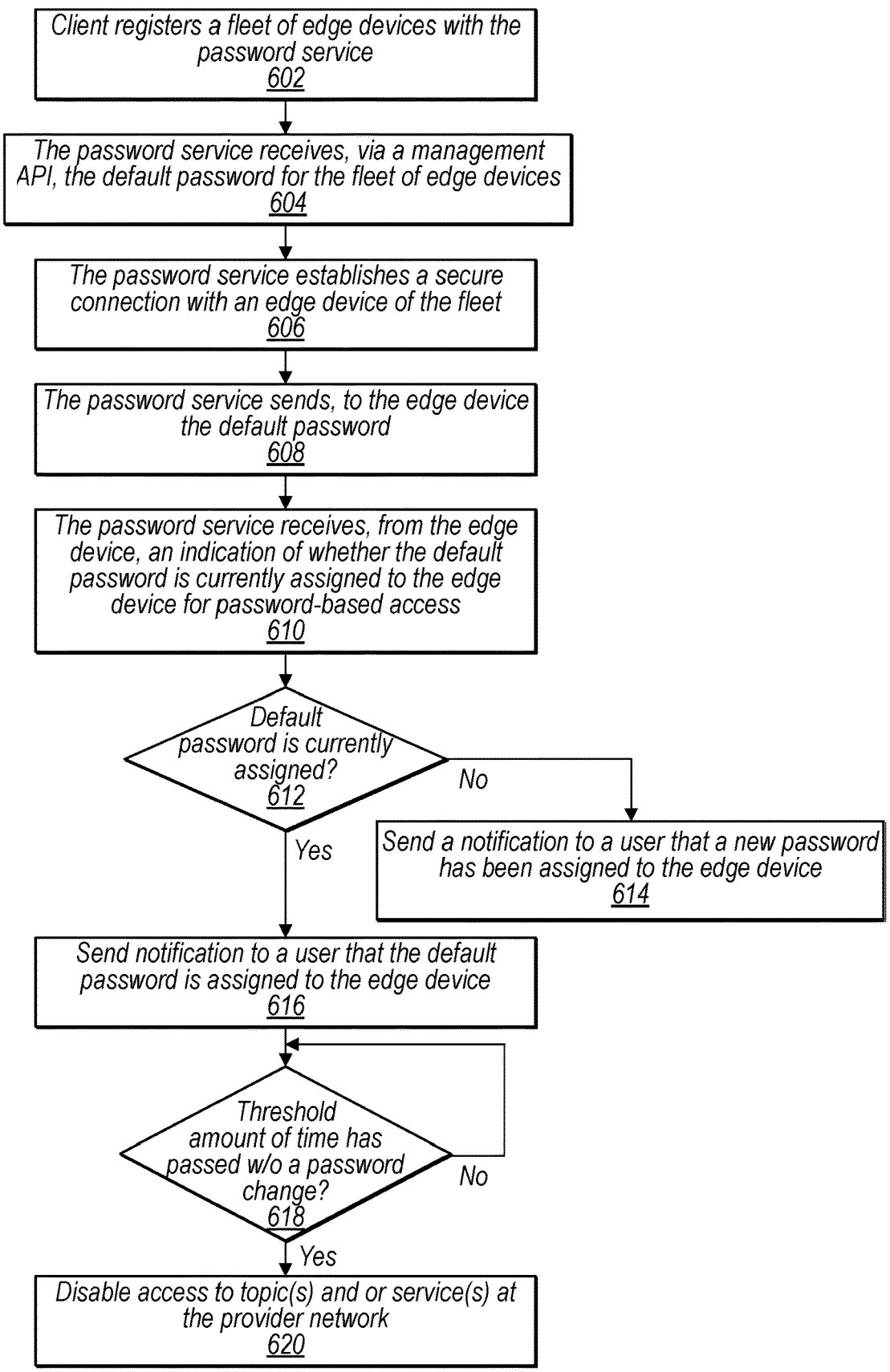
FIG. 6 is a high-level flowchart illustrating various methods and techniques for testing for unchanged passwords in IoT devices, according to some embodiments.

These techniques, as well as the techniques discussed with regard to FIG. 6, may be implemented using components or systems as described above with regard to FIGS. 1-4, as well as other types of components or systems, and thus the following discussion is not intended to be limiting as to the other types of systems that may implement the described techniques. For example, any of the techniques may be implemented by one or more services of a provider network and/or a local service/application of a client network, in various embodiments.

At block 502, an agent of an edge device of a client network retrieves security data from the password database of the edge device. At block 504, the agent identifies the hashing algorithm, the salt string, and the hashed string based on the security data. At block 506, the agent establishes a connection with the remote provider network in accordance with a secure communication protocol (e.g., TLS).

At block 508, the agent receives, from the provider network via the connection, a default password associated with the edge device. At block 510, the agent combines the salt string with the default password to generate a salted default password. At block 512, the agent applies the hashing algorithm to the salted default password to generate a new hashed string.

At block 514, the agent determines whether the hashed string (obtained from the password database) matches the new hashed string. If so, then at block 516, the agent sends to the provider network an indication that the default password is currently assigned to the edge device for password-based access. If not, then at block 518, the agent sends to the provider network an indication that the default password is not currently assigned to the edge device for password-based access.

Note that in various embodiments, the blocks may occur in any other order than the order shown for FIGS. 5 and 6 and/or any of number of the blocks may occur at the same time or at least partially overlap in time (e.g., the combining of the salt string and the default password may occur at the same time or partially overlap with the identification of the hashing algorithm, salt string, and hashed string). As one example of a different order, the actions described for blocks 508, 510, and 512 may occur, followed by the actions described for blocks 502, 504, and 506, and then the determination of block 514 may occur. In that case, the actions of blocks 502, 504, and 506 may be triggered in response to the edge device receiving the default password from the provider network. Any other order of blocks and/or timing of the blocks may occur, in various embodiments.

FIG. 6 is a high-level flowchart illustrating various methods and techniques for testing for unchanged passwords in IoT devices, according to some embodiments.

At block 602, a client registers a fleet of edge devices with the password service. In some embodiments, a different service of the provider network may be used to onboard/register new edge devices for a client and as part of the registration, the client may indicate whether the new edge devices will be used with the password service; if so, then those edge devices may be registered with the password service also. At block 604, the password service receives, via a management API, the default password for the fleet of edge devices. At block 606, the password service establishes a secure connection with an edge device of the fleet.

At block 608, the password service sends, to the edge device the default password. At block 610, the password service receives, from the edge device, an indication of whether the default password is currently assigned to the edge device for password-based access.

At block 612, the password service determines, based on the received indication, whether the default password is currently assigned. If the received indication indicates that the default password is not currently assigned to the edge device for password-based access, then at block 614, the password service sends a notification to a user that a new password has been assigned to the edge device. If the received indication indicates that the default password is currently assigned to the edge device for password-based access, then at block 616, the password service sends a notification to a user that the default password is assigned to the edge device.

At block 618, the password service determines whether a predefined threshold amount of time (e.g., 1 hour) has passed since receiving the notification that the default password is still assigned to the edge device without receiving an indication of a change of the password. In other words, the password service determines whether passage of at least a predefined threshold amount of time has occurred since the receiving of the indication that the default password is currently assigned to the edge device without receiving of an indication that the default password is no longer currently assigned to the edge device.

If so, then as block 620, the password service disables access of the edge device to one or more particular topics and/or disables access of the edge device to one or more particular services at the provider network (e.g., effectively quarantining the device). From the perspective of the edge device, subsequent to passage of at least a predefined threshold amount of time since the sending of the indication to the password service that the default password is currently assigned to the edge device without sending an indication to the provider network that the default password is no longer currently assigned to the edge device, the edge device may no longer be able access one or more particular topics (e.g., receive messages that are published to a topic or publishing messages to the topic) and/or may no longer be able to access one or more particular services at the provider network. This may help to reduce the chance of unauthorized access to the provider network by someone who uses the default password for the edge device. Returning to block 618, if the threshold amount of time has not yet passed, then the process continues to wait at block 618.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors.

The program instructions may implement the functionality described herein (e.g., the functionality of the agent, the password service, and any other components that implement the techniques described herein). The various methods as illustrated in the figures and described herein represent example embodiments of methods. The order of any method may be changed, and various elements may be added, reordered, combined, omitted, modified, etc.

Figure 7:
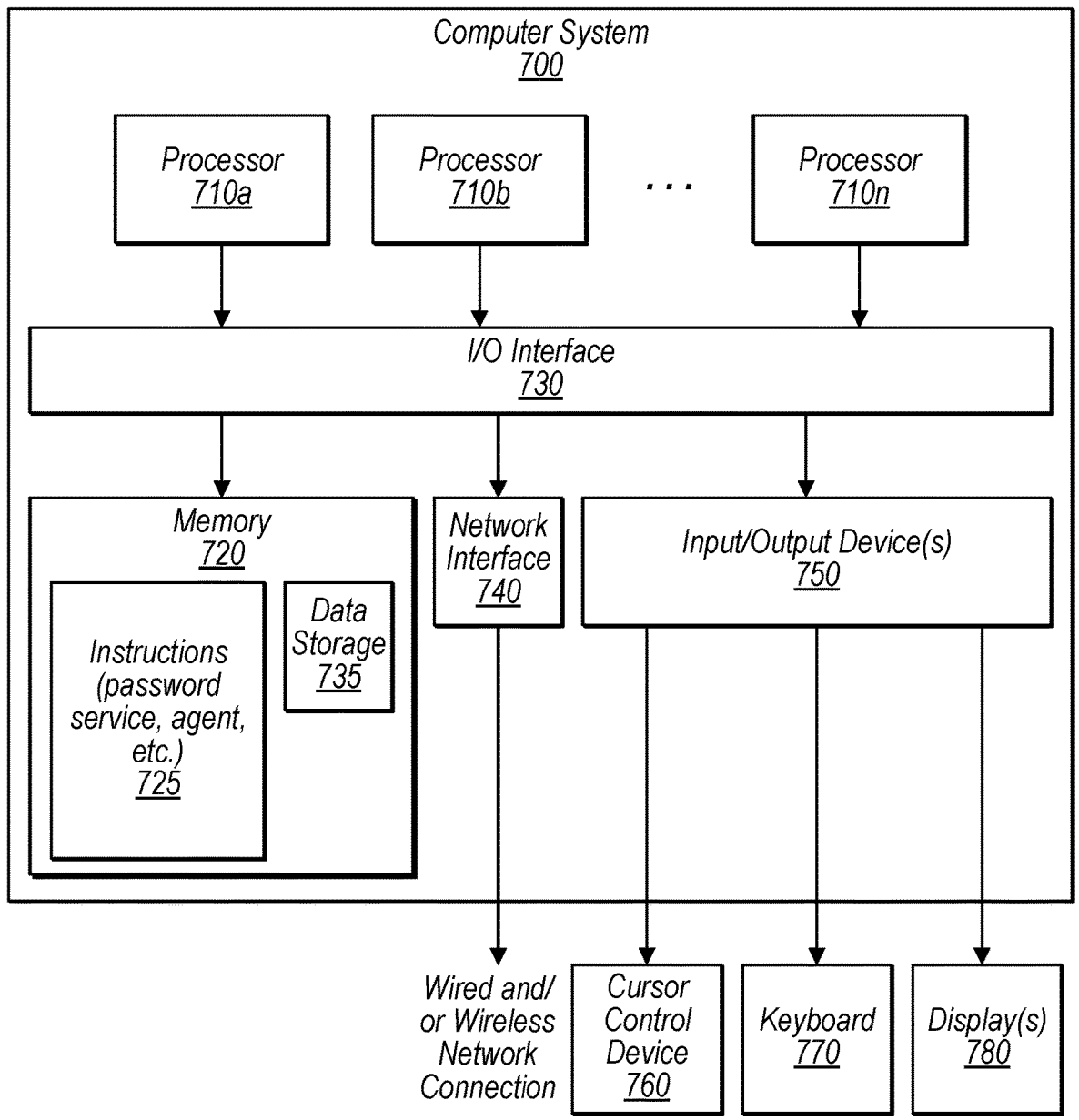
FIG. 7 is a block diagram illustrating an example computing system, according to some embodiments.

Embodiments to implement testing for unchanged passwords in IoT devices, which may interact with various other systems or devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) may include standard computer monitor(s) and/or other display systems, technologies or devices, in one embodiment. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, in one embodiment. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 720 may store program instructions 725 and/or data accessible by processor 710, in one embodiment. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the password service, agent, and any other components) are shown stored within system memory 720 as program instructions 725 and data storage 735, respectively. In other embodiments, program instructions and/or data may be received, sent or stored upon different types of computer-accessible media or on similar media separate from system memory 720 or computer system 700. A computer-accessible medium may include non-transitory storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740, in one embodiment.

In one embodiment, I/O interface 730 may be coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700, in one embodiment. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700, in one embodiment. Multiple input/output devices 750 may be present in computer system 700 or may be distributed on various nodes of computer system 700, in one embodiment. In some embodiments, similar input/output devices may be separate from computer system 700 and may interact with one or more nodes of computer system 700 through a wired or wireless connection, such as over network interface 740.

As shown in FIG. 7, memory 720 may include program instructions 725 that implement the various embodiments of the systems as described herein, and data store 735, comprising various data accessible by program instructions 725, in one embodiment. In one embodiment, program instructions 725 may include software elements of embodiments as described herein and as illustrated in the Figures. Data storage 735 may include data that may be used in embodiments (e.g., default passwords, password status, hashing algorithm, salt string, hashed strings, etc.). In other embodiments, other or different software elements and data may be included.

Those skilled in the art will appreciate that computer system 700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 700 may be transmitted to computer system 700 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. An edge device of a local network, the edge device comprising:
    a password database;
    one or more processors; and
    one or more memories, wherein the one or more memories have stored thereon instructions, which when executed by the one or more processors, cause the one or more processors to implement an agent to:
        retrieve security data from the password database of the edge device of a client of the provider network, wherein the security data indicates a hashing algorithm, a salt string, and a first hashed string generated from a password associated with the edge device;
        identify the hashing algorithm, the salt string, and the first hashed string based on the obtained security data;
        establish a connection with a remote provider network in accordance with a secure communication protocol;
        receive, from the provider network via the connection, a default password assigned to the edge device, wherein the default password is stored at the remote provider network and associated with the edge device based on previous reception of the default password from the client by an interface of the remote provider network;
        combine, by the agent of the edge device of the local network, the salt string with the default password previously assigned to the edge device and that was received by the edge device via the connection from the remote provider network to generate a salted default password;
        apply the hashing algorithm to the salted default password to generate a second hashed string;
        determine whether the first hashed string generated from the password that is currently assigned to the edge device matches the second hashed string generated from the default password received from the provider network, wherein the default password is stored at the remote provider network and associated with the edge device based on the previous reception of the default password from the client by the interface of the remote provider network; and
        in response to the determination by the agent of the edge device of the local network of whether the first hashed string generated from the password that is currently assigned to the edge device matches the second hashed string generated from the default password received from the provider network, wherein the default password is stored at the remote provider network and associated with the edge device based on the previous reception of the default password from the client by the interface of the remote provider network, send by the agent of the edge device of the local network to the provider network an indication of whether the default password is currently assigned to the edge device for password-based access.

2. The edge device as recited in claim 1, wherein the determination of whether the first hashed string matches the second hashed string is a determination that the first hashed string does not match the second hashed string, and wherein the indication is that the default password is not currently assigned to the edge device for password-based access.

3. The edge device as recited in claim 1, wherein the instructions cause the one or more processors to implement the agent to subscribe to a topic according to a publish-subscribe network protocol, and wherein to receive, from the provider network via the connection, the default password associated with the edge device, the instructions cause the one or more processors to implement the agent to:
    receive, from the provider network, a message that was published to the topic, wherein the message comprises the default password.

4. The edge device as recited in claim 1, wherein the retrieval of the security data by the agent from the password database is based on permission granted to the agent to access the password database.

5. The edge device as recited in claim 1, wherein the edge device is inaccessible from outside of the local network via a public internet protocol address.

6. A method, comprising:
    performing, by an agent of an edge device of a local network:
        establishing a connection with a remote provider network in accordance with a secure communication protocol;
        receiving, from the provider network via the connection, a default password assigned to the edge device of a client of the provider network, wherein the default password is stored at the remote provider network and associated with the edge device based on previous reception of the default password from the client by an interface of the remote provider network;
        combining, by the agent of the edge device of the local network, a salt string with the default password previously assigned to the edge device and that was received by the edge device via the connection from the remote provider network to generate a salted default password;
        applying a hashing algorithm to the salted default password to generate a first hashed string;

determining whether a second hashed string at the edge device generated from a password that is currently assigned to the edge device matches the first hashed string generated from the default password received from the provider network, wherein the default password is stored at the remote provider network and associated with the edge device based on the previous reception of the default password from the client by the interface of the remote provider network; and in response to determining whether the second hashed string at the edge device generated from the password that is currently assigned to the edge device matches the first hashed string generated from the default password received from the provider network, wherein the default password is stored at the remote provider network and associated with the edge device based on the previous reception of the default password from the client by the interface of the remote provider network:

sending by the agent of the edge device of the local network to the provider network an indication that the default password is currently assigned to the edge device for password-based access, or sending by the agent of the edge device of the local network to the provider network an indication that the default password is not currently assigned to the edge device for password-based access.

7. The method as recited in claim 6, further comprising:
retrieving security data from a password database accessible to the edge device, wherein the security data indicates the hashing algorithm, the salt string, and the second hashed string;
parsing the security data to identify the hashing algorithm, the salt string, and the second hashed string.

8. The method as recited in claim 7, wherein retrieving security data from a password database comprises:
determining, by the edge device, that the agent is granted permission to access the password database; and
in response to determining the agent is granted permission to access the password database, providing access of the password database to the agent.

9. The method as recited in claim 8, the method further comprising performing, by the edge device:
generating the salt string based on an algorithm.

10. The method as recited in claim 6, wherein combining the salt string with the default password to generate the salted default password comprises:
prepending the salt string to the default password, or
appending the salt string to the default password.

11. The method as recited in claim 6, wherein the edge device is connected to the local network, and wherein the edge device is inaccessible from outside of the local network via a public internet protocol address.

12. The method as recited in claim 6, further comprising subscribing to a topic according to a publish-subscribe network protocol, and wherein receiving, from the provider network via the connection, the default password comprises:
receiving, from the provider network, a message that was published to the topic, wherein the message comprises the default password.

13. The method as recited in claim 6, wherein the edge device is associated with the client of the provider network, and wherein the default password is based on a previous submission of the default password to the provider network via a management interface of the client.

14. The method as recited in claim 6, wherein the agent determines that the second hashed string at the edge device matches the first hashed string, wherein the agent sends to the provider network an indication that the default password is currently assigned to the edge device for password-based access, and further comprising:

subsequent to sending to the provider network an indication that the default password is currently assigned to the edge device for password-based access:

receiving, from the provider network via the connection, the default password associated with the edge device;

combining the salt string with the default password to generate the salted default password;

applying the hashing algorithm to the salted default password to generate the first hashed string;

determining a third hashed string at the edge device does not match the first hashed string; and in response to determining that the third hashed string at the edge device does not match the first hashed string, sending to the provider network an indication that the default password is not currently assigned to the edge device for password-based access.

15. One or more non-transitory computer-accessible storage media storing program instructions that when executed on or across one or more processors of an edge device of a local network cause the edge device to:

receive, from a remote provider network via a secure connection, a default password assigned to the edge device of a client of the provider network, wherein the default password is stored at the remote provider network and associated with the edge device based on previous reception of the default password from the client by an interface of the remote provider network;

combine, by an agent of the edge device of the local network, a salt string with the default password previously assigned to the edge device and that was received by the edge device via the connection from the remote provider network to generate a salted default password;

apply a hashing algorithm to the salted default password to generate a first hashed string;

determine that a second hashed string at the edge device generated from a password that is currently assigned to the edge device matches the first hashed string generated from the default password received from the provider network, wherein the default password is stored at the remote provider network and associated with the edge device based on the previous reception of the default password from the client by the interface of the remote provider network; and in response to the determination that the second hashed string generated from the password that is currently assigned to the edge device matches the first hashed string generated from the default password received from the provider network, wherein the default password is stored at the remote provider network and associated with the edge device based on the previous reception of the default password from the client by the interface of the remote provider network, send by the agent of the edge device of the local network to the provider network an indication that the default password is currently assigned to the edge device for password-based access.

16. The one or more storage media as recited in claim 15, wherein the program instructions when executed on or across the one or more processors further cause the edge device to, subsequent to the sending to the provider network the indication that the default password is currently assigned to the edge device:

receive, from the remote provider network via a secure connection, the default password associated with the edge device;

combine the salt string with the default password to generate the salted default password;

apply the hashing algorithm to the salted default password to generate the first hashed string;

determine that a third hashed string at the edge device does not match the first hashed string; and in response to the determination that the third hashed string at the edge device does not match the first hashed string, send to the provider network an indication that the default password is not currently assigned to the edge device for password-based access.

17. The one or more storage media as recited in claim 15, wherein the edge device is connected to the local network, and wherein the edge device is inaccessible from outside of the local network via a public internet protocol address.

18. The one or more storage media as recited in claim 15, wherein the program instructions when executed on or across the one or more processors further cause the edge device to subscribe to a topic according to a publish-subscribe network protocol, and wherein to receive, from the remote provider network via the secure connection, the default password associated with the edge device, the instructions when executed on or across the one or more processors further cause the edge device to:

receive, from the provider network, a message that was published to the topic, wherein the message comprises the default password.

19. The one or more storage media as recited in claim 18, wherein subsequent to passage of at least a predefined threshold amount of time since the sending of the indication that the default password is currently assigned to the edge device without sending of an indication to the provider network that the default password is not currently assigned to the edge device, the edge device is no longer able to receive messages that are published to the topic.

20. The one or more storage media as recited in claim 15, wherein the program instructions when executed on or across the one or more processors further cause the edge device to access at least one service of the provider network, and wherein subsequent to passage of at least a predefined threshold amount of time since the sending of the indication that the default password is currently assigned to the edge device without sending of an indication to the provider network that the default password is not currently assigned to the edge device, the edge device is no longer able to access the at least one service of the provider network.

\* \* \* \* \*